United States Patent
Fang et al.

(10) Patent No.: US 11,477,846 B2
(45) Date of Patent: Oct. 18, 2022

(54) APPLICATION MOBILITY MECHANISM FOR EDGE COMPUTING

(71) Applicants: ZTE Corporation, Guangdong (CN); Yonggang Fang, San Diego, CA (US); Qiang Huang, Guangdong (CN); ZhiQiang Han, Guangdong (CN); Bo Sun, Guangdong (CN)

(72) Inventors: Yonggang Fang, San Diego, CA (US); Qiang Huang, Guangdong (CN); ZhiQiang Han, Guangdong (CN); Bo Sun, Guangdong (CN)

(73) Assignee: ZTE Corporation, Guangdong (CN)

( * ) Notice: Subject to any disclaimer, the term of this patent is extended or adjusted under 35 U.S.C. 154(b) by 53 days.

(21) Appl. No.: 17/045,754

(22) PCT Filed: Apr. 6, 2019

(86) PCT No.: PCT/US2019/026223
§ 371 (c)(1),
(2) Date: Oct. 6, 2020

(87) PCT Pub. No.: WO2019/195817
PCT Pub. Date: Oct. 10, 2019

(65) Prior Publication Data
US 2021/0059011 A1  Feb. 25, 2021

(30) Foreign Application Priority Data

Apr. 7, 2018  (WO) .............. PCT/CN2018/082100

(51) Int. Cl.
*H04W 80/12* (2009.01)
*H04L 67/1095* (2022.01)
(Continued)

(52) U.S. Cl.
CPC .......... *H04W 80/12* (2013.01); *H04L 67/1095* (2013.01); *H04W 8/08* (2013.01); *H04W 80/02* (2013.01)

(58) Field of Classification Search
CPC ............................. H04W 80/02; H04W 80/12
See application file for complete search history.

(56) References Cited

U.S. PATENT DOCUMENTS

| 8,773,976 | B1 * | 7/2014 | Puliatti | ................. | H04L 1/1829 |
| | | | | | 370/216 |
| 2006/0235927 | A1 * | 10/2006 | Bhakta | ..................... | G09B 5/06 |
| | | | | | 709/204 |

(Continued)

FOREIGN PATENT DOCUMENTS

CN      107333281    11/2017
WO      2017/91960 A1  6/2017
(Continued)

OTHER PUBLICATIONS

Fabio Giust et al., 'MEC Deployments in 4G and Evolution Towards 5G', ETSI White Paper No. 24, ISBN No. 979-10-92620-18-4, First edition, Mar. 28, 2018.

(Continued)

*Primary Examiner* — Fahmida S Chowdhury
(74) *Attorney, Agent, or Firm* — Perkins Coie LLP

(57) ABSTRACT

Application mobility is a unique feature of the edge computing to support relocation of application instance across edge computing hosts or between edge computing host and cloud computing over underlying mobile network. With the active-standby mode application instance implementation with support of L2 networks, the application mobility could achieve the service continuity with low latency switching time. An application mobility mechanism can be implemented in the data plane of edge computing host under the control of edge computing platform and management. It can (Continued)

be also implemented in L2 switching function of the User Plane Function in 5G networks.

19 Claims, 13 Drawing Sheets

(51) Int. Cl.
*H04W 8/08* (2009.01)
*H04W 80/02* (2009.01)

(56) References Cited

U.S. PATENT DOCUMENTS

2019/0045409 A1* 2/2019 Rasanen ............... H04W 36/12
2019/0261260 A1* 8/2019 Dao .................. H04W 36/0011

FOREIGN PATENT DOCUMENTS

| WO | 2017129742 A1 | 8/2017 |
| WO | 2017194619 A1 | 11/2017 |
| WO | 2017206001 A1 | 12/2017 |

OTHER PUBLICATIONS

Korean Intellectual Property Office, International Search Report and Written Opinion for International Application No. PCT/US2019/026223, dated Jul. 12, 2019.
ETSI "Mobile Edge Computing (MEC)" End to End Mobility Aspects GR MEC 018 V1.1.1 (Oct. 2017), 53 pages.
3GPP "Study on Architecture for Next Generation System" Release 14 3GPP TR 23.799 v1.2.0, Nov. 2016, 526 pages.

* cited by examiner

FIG. 4 an example of active-standby app instantiation

FIG. 5 Active and standby application instance switching via L2 network

FIG. 6 Edge Computing in 5G network

FIG. 7 Active and standby application instance switching via L2 bridged networks FIG. 8 Service chaining over L2 switched networks

APPLICATION MOBILITY MECHANISM FOR EDGE COMPUTING

CROSS REFERENCE TO RELATED APPLICATIONS

This patent document is a 35 USC § 371 National stage application of International Application No. PCT/US2019/026223, filed on Apr. 6, 2019, which claims the benefit of priority of International Application No. PCT/CN2018/082100, filed on Apr. 7, 2018. The entire content of the before-mentioned patent applications is incorporated by reference as part of the disclosure of this document.

TECHNICAL FIELD

This patent document relates to edge computing and, in particular, to techniques for support of application mobility in an edge computing system.

BACKGROUND

This patent document relates to a mechanism of support application mobility for transferring user or application context and/or relocating an application instance to another edge computing host over tele-communication networks, ether wired or wireless. Edge computing is a computing environment at the network edge to provide shared computing resource, data storage and/or other functions or services for running applications. Compared to cloud computing resources, edge computing resources are located at the edge of the access communication networks to reduce the transmission latency and provide better quality of service (QoS) of Internet services to end consumers.

SUMMARY

This patent document describes methods and technologies of supporting the mobility of applications running on an edge computing host to another host when the user equipment (UE) moves to a new service area in the underlying networks.

In one example aspect, an application mobility method provides a mechanism of operating two or more instances of the same application on different edge computing hosts with the synchronized operational state, for example, by forming mirrored application instances in multiple edge computing hosts.

In another example aspect, an application mobility method provides a mechanism of setting the mirrored application instances running on different edge computing hosts into one of at least two modes: an active mode and a standby mode. Only the active mode application instance delivers the service to the UE client, while the standby mode application instance(s) can receive the information from the UE client or active application instance for synchronization of the operational state.

In another example aspect, a method of supporting application mobility is provided via establishing the same protocols of IP and above layer among different instances of the same application running on different edge computing hosts so as to eliminate the necessity of rebinding upper layer protocols during the application relocation.

In another example aspect, a method of supporting application mobility is provided via the layer 2 (L2) switched network to control the layer 2 package delivery for providing the transparency to upper layer protocols associated to application instances and reducing the latency of application relocation between the edge computing hosts.

In another example aspect, a method of application mobility via the layer 2 switched network is provided to support of chaining the services from multiple difference application instances running on different edge computing hosts, and deliver the final chained service to end users.

In an example aspect, a method of application mobility via the layer 2 switched network is provided to support of increasing the services capability of application through allocating multiple application instances running on different edge computing hosts.

In yet another example aspect, a method of supporting application mobility is provided via implementing the layer 2 switched network function in user plane function (UPF) of 5G networks.

In yet another example aspect, an apparatus that comprises a processor programmed to implement one or more methods described herein is disclosed.

In yet another aspect, the methods may be embodied in the form of computer-executable code that is stored on a computer-readable program medium. The code, when executed by a processor, causes the processor to implement one or more of the disclosed techniques.

Details of the above aspects and their implementations, and other features, are set forth in the accompanying drawings, the description and the claims.

DETAILED DESCRIPTION

Figure 1A:
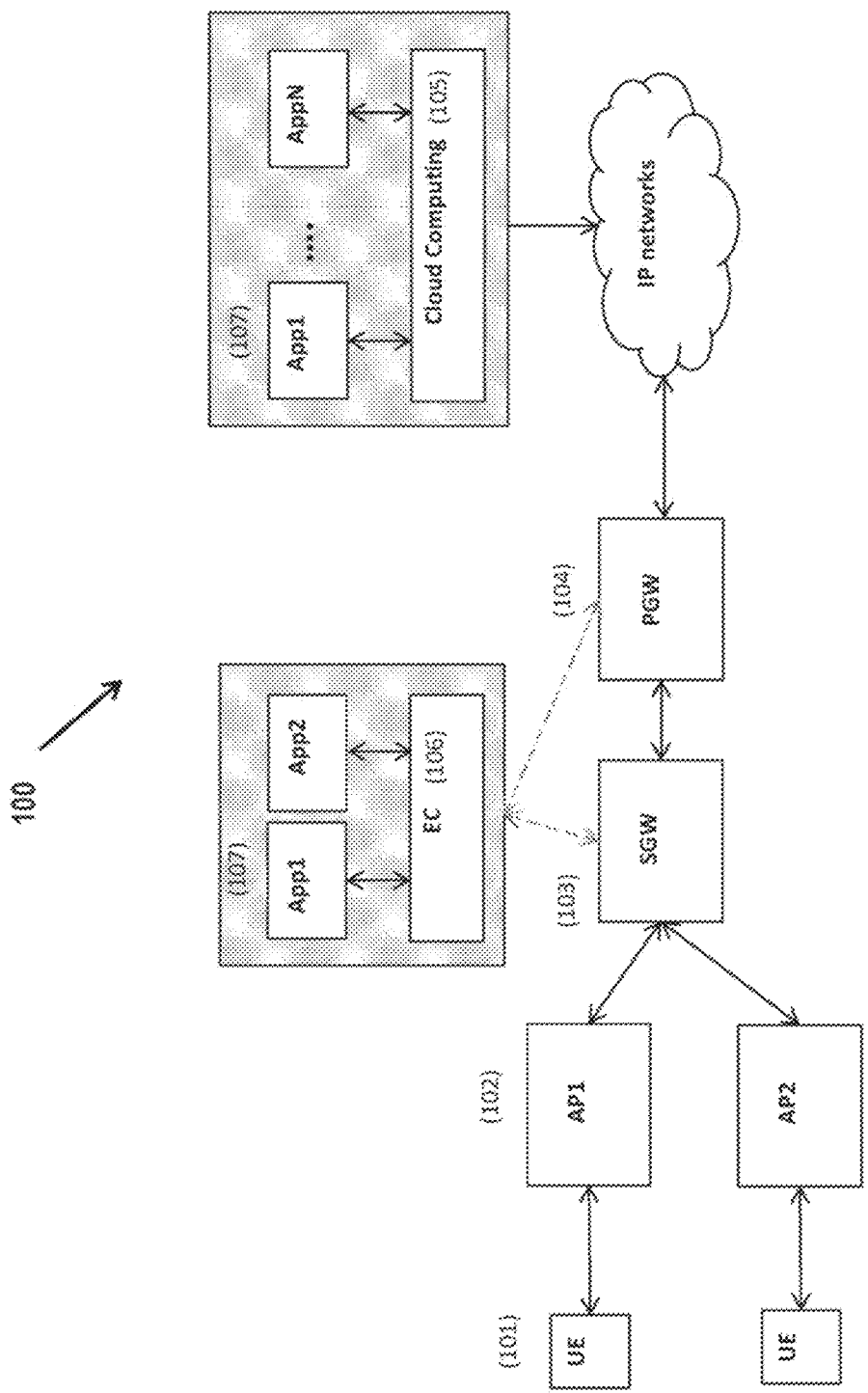
FIG. 1A shows an example of wireless communication network architecture for Internet services running on the cloud computing and/or edge computing system.

This document describes techniques, mechanisms, devices, and systems for support of application mobility in edge computing environment due to the user equipment's movement in the underlying bearer network, and/or balancing the computing loads among edge computing hosts.

Edge computing is a computing environment which could be located at the access point or gateway of packet data communication network. Edge computing offers the shared environment of computing resource, storage resource and other resource for service providers to run applications close to the end users for offering the best experience of services. Compared to a cloud computing, an edge computing deployed closer to end user equipment (UE) can provide services with lower latency and better quality of service (QoS).

Edge computing system can be implemented based on virtualization, like network function virtualization (NFV) or container based technologies. The concept of virtualization is to capsulate complexity of underlying bearer networks, computing hardware and varieties of storage, and offer the unified software interfaces to applications. Therefore, the edge computing system could use a set of generic application programming interfaces (APIs) of computing resources to support the operation of Internet applications, regardless of what hardware infrastructures of computing or telecommunication resource are.

An edge computing system could provide the platform as a service (PaaS) model, which features a couple of basic services, like edge computing enablement, radio and transport network information service, location service, and application traffic path change detection service, etc. In addition, the edge computing system could provide the application mobility as service invented in this innovation to allow applications running on the edge computing to subscribe it according to their needs.

The disclosed techniques may be embodied in a method that provides a mechanism through the application mobility service to predict the potential target edge computing host(s) which the application will be relocated to.

The disclosed techniques may be embodied in an application mobility method that provides a mechanism of configuring the application instances running on different edge computing hosts as mirrored instances for support of service continuity.

In an example aspect, a method of support application mobility is provided via instantiating two or more same applications at multiple EC hosts, and make one application instance as active to serve UE application client, and make other application instances as standby with their application context and UE contexts being synchronized with the active application instance's.

In another example aspect, a method of support application mobility is provided via setting the same IP address for instances with same application running on multiple EC hosts, but with different Layer 2 MAC addresses which are associated to EC hosts.

In an example aspect, a method of supporting application mobility is provided via establishing the same protocols above IP layer for different instances of same application running on different edge computing hosts so as to eliminate the necessity of rebinding upper layer protocols during the application relocation.

In another example aspect, a method of support application mobility is provided via controlling the traffic routing, forwarding or steering through the L2 network. The edge computing orchestrator, coordinating the EC host in the edge computing system, configures the traffic rule of L2 network to route the application traffic between the active application instance running on the EC host and the UE application client. The edge computing orchestrator, coordinating EC hosts, also configures the traffic rules of L2 network for the standby application instances to receive application traffic from the UE client but not forward the application traffic to the UE client.

In yet another example aspect, a method of support application mobility is provided via switching the active application instance with associated L2 network and one of standby application instances with associated L2 network, which make the upper link (UL) traffic to be routed to the newly active application instance by the L2 network, and down link (DL) traffic from newly active application instance to the UE application client by the L2 network. This active and standby application handoff is transparent to upper layer protocols associated to application instances and lowers the latency of application relocation between the edge computing hosts to support service continuity.

In another example aspect, a method of application mobility via the layer 2 switched network is provided to support of chaining the services from multiple difference application instances running on different edge computing hosts, and deliver the final chained service to the end user.

In an example aspect, a method of application mobility via the layer 2 switched network is provided to support of increasing the service capability of application through allocating multiple application instances running on different edge computing hosts so that the traffic load of the service can be distributed to multiple EC hosts.

In yet another example aspect, the method of support application mobility in the edge computing may be implemented in the user plane function (UPF) of 5G networks for controlling of application traffic routing or forwarding of L2 networks.

Details of the above aspects and their implementations, and other features, are set forth in the accompanying drawings, the description and the claims.

Section headings are used in the present document only for lucidity, and do not in any way limit the scope of the disclosed technology.

FIG. 1A illustrates an example of a wireless communication system with cloud computing and edge computing system 100.

The wireless communication may include:

UE 101: The user equipment is a wireless device which is used to access a wireless access point such eNodeB of 3GPP radio access network, or AP of WLAN, etc. It provides a connectivity for the application software (client) to communicate with the applications (107) running on either the Cloud (105) or Edge Computing (EC) (106).

AP 102: it is an access point of radio access network to provide the air interface to mobile device (UE). The access point could be an eNodeB, such as small cell AP, or femto AP of mobile networks specified by 3GPP, or an AP of IEEE802.11 network.

SGW 103: The serving gateway is a network entity connecting to APs and the packet data network (PDN) gateway PGW 104. It routes/forwards user data packets between AP and PGW, and acts as the mobility anchor for the user plane during inter-AP handovers and as the anchor for mobility between 3GPP and other technology networks. The SGW aggregates UL traffic from multiple APs and sends to the PGW, and distribute DL traffic from PGW to different APs. The SGW may include a User Plane Function for performing traffic routing and steering the user traffic to applications running on an EC host (106).

PGW 104: The PDN gateway is an anchor point of IP traffic, providing connectivity from UE to external packet data networks. In order to provide traffic security and integrity, PGW uses GTP to tunnel DL traffic to SGW. SGW also uses the GTP to tunnel UL traffic to PGW. The PGW performs policy enforcement, packet filtering for each user, lawful interception and packet screening. It also acts as the anchor point for mobility between 3GPP and non-3GPP technologies such as trusted WLAN, and provides DHCP function for IP address assignment to UEs and DNS for domain name search. Depending on the implementation, PGW may include UPF for performing traffic routing and steering the user traffic to applications running on EC (106).

When the Edge Computing is deployed in the private networks such as enterprise networks, the Cloud Computing (105) in FIG. 1A could be the enterprise data center to provide information services, and transport networks including such as SGW and PGW in FIG. 1A could be simplified. The transport network could be leased from the telecom network service provider, or be implemented separately as a private transport network connecting enterprise computing devices.

Figure 1B:
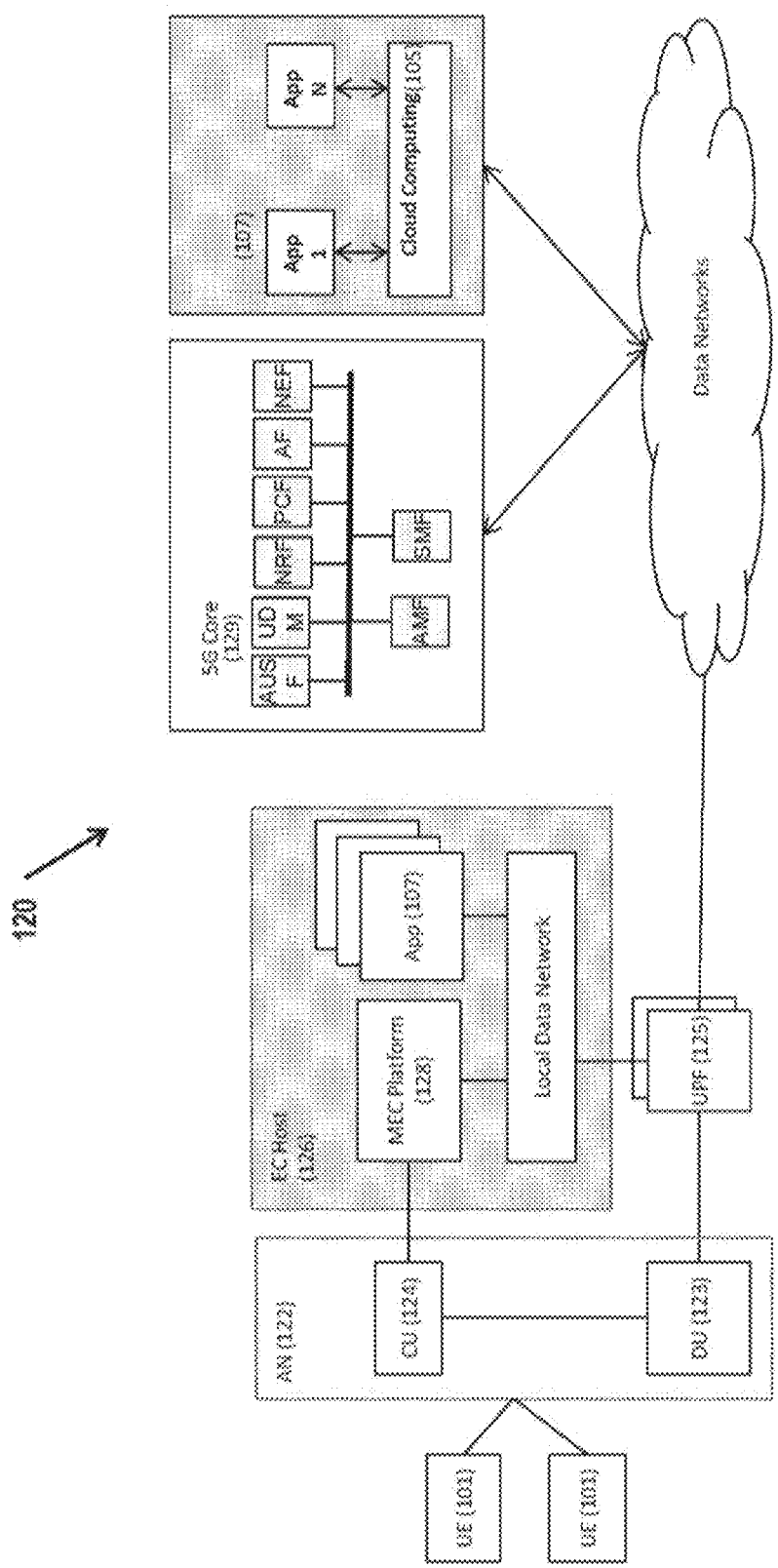
FIG. 1B shows an example of network architecture for Internet services running on cloud computing and edge computing system over 5G networks.

FIG. 1B illustrates an example system 120 of Internet services running on Cloud Computing and Edge Computing over the 5G networks. The 5G access network consists of radio equipment, data unit (DU) (123) and control unit (CU) (124). The DU (123) processes the user data traffic and communicates with the User Plane Function (UPF) (125) which performs the user traffic forwarding and steering function to route the user data packet to either EC host (126) or Cloud Computing (105). The Cloud Computing (105) can be owned by the mobile network operator or a third-party IT service provider. The Edge Computing host (126) is typical owned by mobile network operators. When it is owned by a third-party service provider, there would be the business agreement between the service provider and the mobile network operator.

The Edge Computing host (126) in FIG. 1B is similar to Edge Computing host (106) in FIG. 1A, but it may have an optional interface to CU (124) to acquire the radio network information from the AN (122) directly.

The 5G Core (129) contains multiple control functions to support operation of 5G networks. For example, the Session Management Function (SMF) is to control UPF (125), the Policy Control Function (PCF) is to control the operation of SMF/UPF according to the subscription policy, and Network Exposure Function (NEF) is to interface to external functional entities for exposure of network capabilities and other information. The orchestration and management of Edge Computing may access to 5G network information through the NEF. Note: the 5G Core control signal paths and interface to EC are not shown in the FIG. 1B.

The application (107) can be run in Cloud Computing (105) or Edge Computing host (126).

The wireless communication network provides at least basic IP connectivity through bearer network for other network entities that host applications for various Internet services. The IP connectivity may be established over the L2 Ethernet switching networks.

An internet service is typically provided by information technology (IT) companies and can be delivered to UE over the wireless communication network, i.e. through PGW to SGW to AP to UE, or through UPF to AN to UE in the 5G network. To better serve end users, IT companies may use a cloud computing environment to run many applications over the shared computing resource for better performance.

A cloud computing platform 105 is a type of Internet-based cloud computing environment that provides shared super computing resources and data storage to other computing devices. It can enable flexible computing environment and resources based on the request for on-demand service, and release them after the service completes. Therefore, the cloud computing platform could optimize computing resource utilization and deliver services with better performance to end users. In addition, the cloud computing platform can offer an opportunity to $3^{rd}$ party service providers with various capabilities to store and process data for their customers.

However, as Internet services are located at the cloud, i.e. a centralized data center, they may be far away from end users who consume services. Therefore, the service traffic may experience a long transmission delay over wireless communication network before arriving to an end user device. Sometimes, the service delay may be over a couple of hundreds of milliseconds, and causes QoS issue for latency-critical services. One possible solution to address this issue is to increase the bandwidth of wireless communication networks so that the network could have some reserved bandwidth for a certain high QoS services. But this solution may only partially solve QoS issue for delay critical services when the wireless communication network encounters congestion. For the delay caused by transmission propagation and data packet processing by multiple network entities, the bandwidth increment would not be very helpful. In addition, it costs a lot for a network service provider to increase and reserve bandwidth of wireless communication networks.

Another possible solution of reducing the latency for the latency-critical services is to move such Internet services to a location close to end users who consume such services, i.e. running such application instance on an edge computing (EC) 106 shown in FIG. 1A or FIG. 1B.

Edge Computing is a computing environment that offers the ability to multiple applications to share the computing, storage and other resources. Typically, an EC host is installed at a location close enough to the end users, so that an application running on the EC host could provide best services to end users. An EC host could be co-located with AP through local gateway, or located at the PGW as shown in FIG. 1A. As applications (or application instances) running on the EC host are very close to the end users, the service latency caused by the transmission over the underlying bearer networks and data processing by the network entities would be significantly reduced comparing to the same service running at the cloud.

Figure 2:
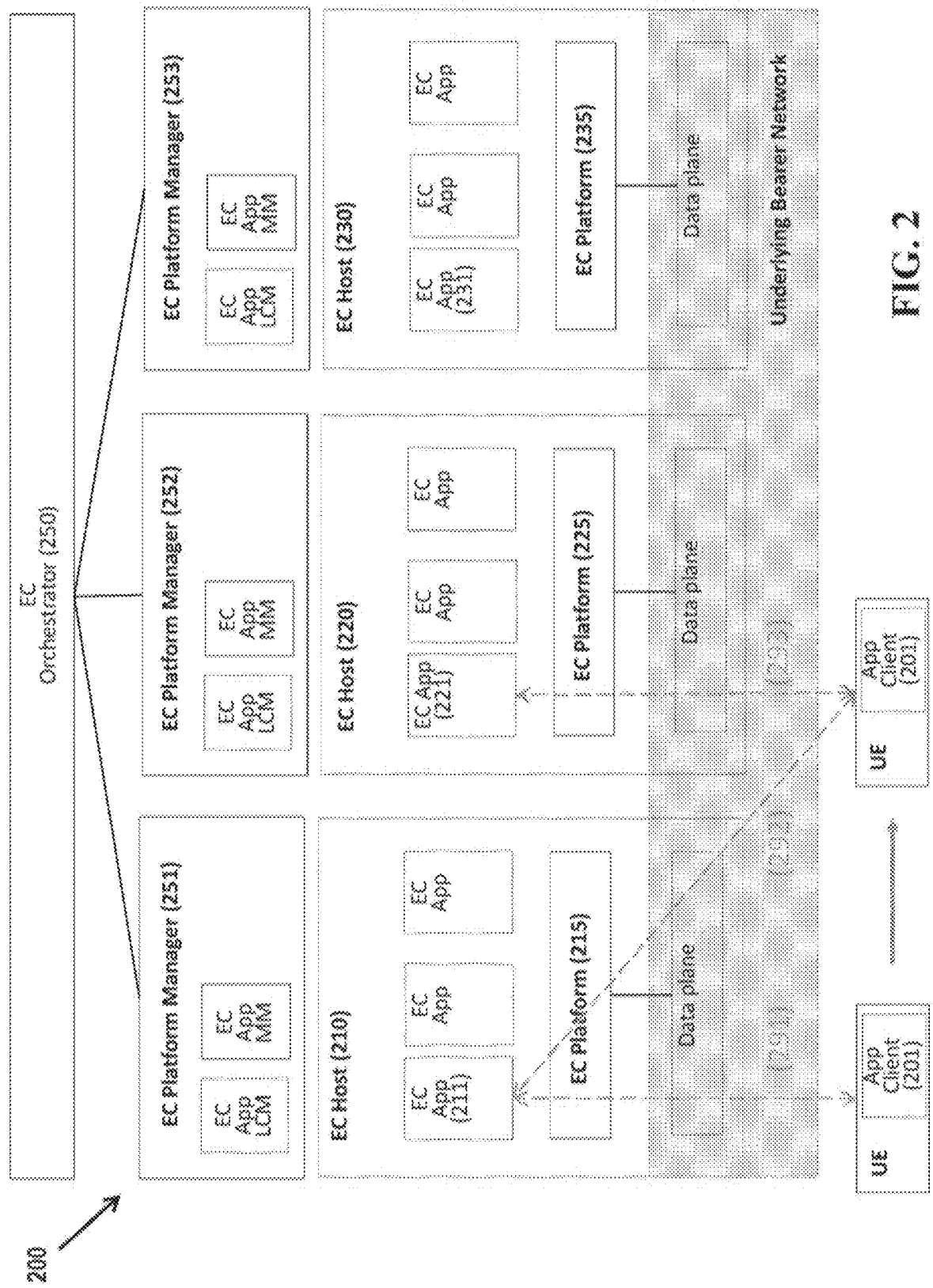
FIG. 2 shows an example of edge computing architecture with multiple edge computing hosts for support of application mobility.

FIG. 2 shows an example of EC architecture with three EC hosts (210), (220) and (230). An Edge Computing system may consist of following network functional entities:

Edge Computing Orchestrator (EC Orchestrator) (250): is a functional entity in the EC system level to manage other edge computing functional entities within the EC system, and orchestrate the operation of applications running on EC hosts.

Edge Computing Platform Manager (EC Platform Manager) (251), (252), (253): provides the edge computing host level management and manage the edge computing specific functionality to support applications running on EC hosts. It also provides application life cycle management, and application mobility management (EC App MM) invented in this patent application.

Edge Computing host (EC Host) (210), (220), (230): is an entity that consists of an EC platform (215), computing resources, storage, and network resources for running application instances (211), (221), (231).

The EC Platform (215), (225), (235): is the entity that provides the services such as registration, radio network information services (RNIS), location services, and the invented application mobility services. The application mobility service provides the support of relocating application between EC hosts, or EC host and the Cloud.

Edge Computing applications (EC app) (211), (221), (231): are the applications (or application instances) provided by the network operator or 3$^{rd}$ party service providers and run on the EC hosts to produce the services to the end users over the underlying bearer networks. The EC application (211), (221), (231) may be the same as the application running on the Cloud Computing, or customized for EC such as access to the location, or radio network bandwidth information to optimize the service.

The UE app (201) is an application client software running on a UE to communicate with the application instance running on an EC host (210), (220), (230) to receive the service. It may communicate with the application running on the Cloud Computing) to receive the service as well.

In the initial setup (291), the UE application client (201) may communicate the EC app (211) running on the EC host (210). When the UE moves to another service area of underlying network, i.e. covered by EC host (220), the EC application (211) on the EC host (210) may continue serving the UE over the data network as shown in (292). But this time the service may not be the best. In order to provide the best service to the UE, the EC application (211) may need to be relocated to EC host (220) as the EC app (221), shown in (293). Once the EC application (211) is relocated to EC host (220) running as EC application (221), the original EC application (211) may be terminated if it is not serving other UEs.

Figure 3:
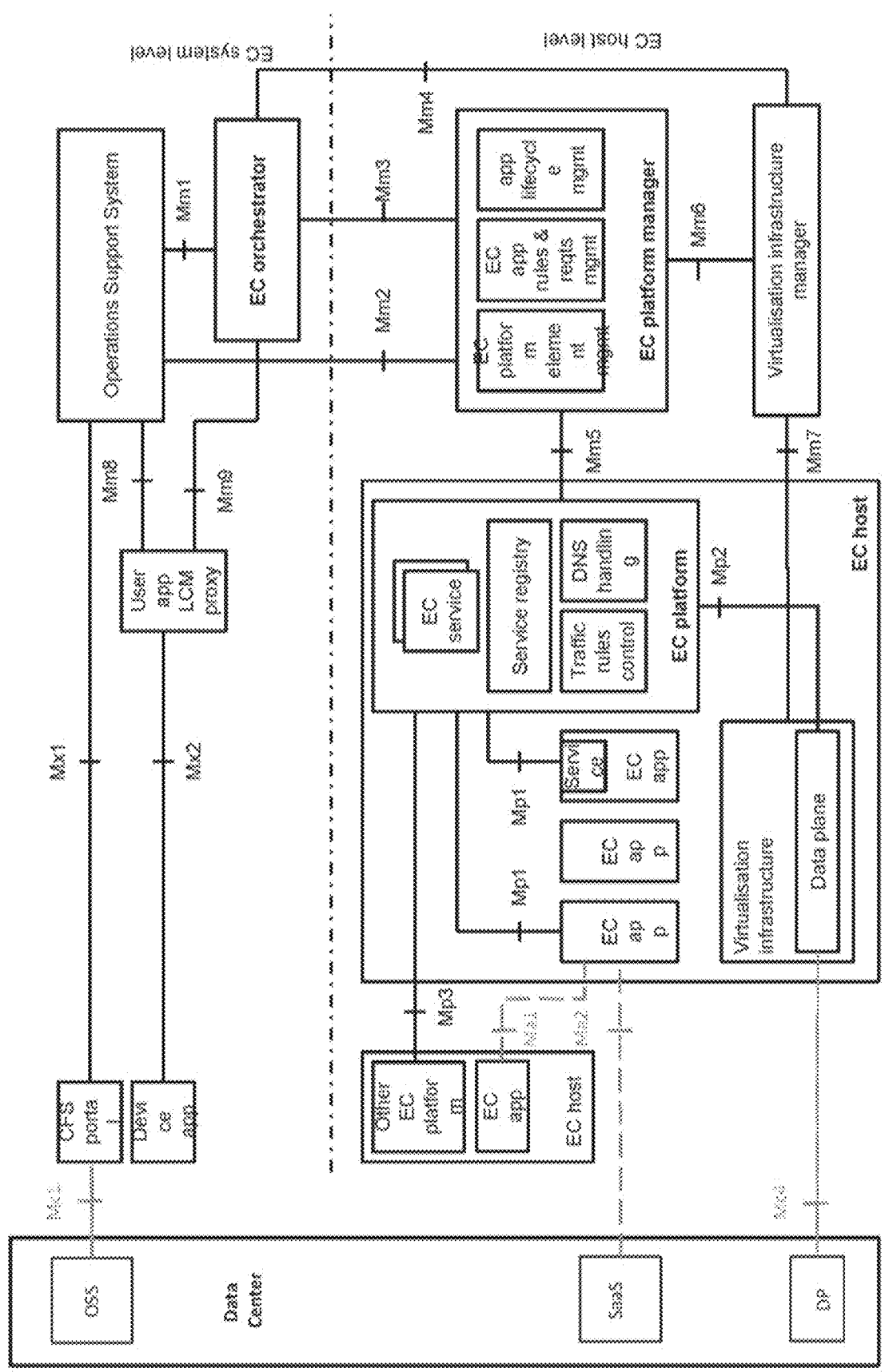
FIG. 3 shows an example edge computing architecture interacting with the cloud computing.

FIG. 3 shows an example of EC architecture interacting with Cloud Computing (CC).

The CC may consist of functional entities like orchestration and management functions which is supported by OSS, Software as a Service (SaaS), Platform as a Service (PaaS) and Infrastructure as a Service (IaaS) which are not shown in the figure, and Data Plane which provides the physical connectivity between CC and EC.

The EC OSS entity and CC OSS entity can communicate with each other through the Customer Facing Service (CFS) portal over reference points Mc1 and Mx1 for the case that CC and EC belong to different service providers. For example, CC and its OSS could belong to IT service provider, while the EC and its OSS function could belong to the telecom network service provider. Under the service agreement between two service providers, the CC OSS may send application packages to EC OSS over CFS portal. In the case that CC is owned by the telecom network service provider, the EC OSS and CC OSS (and orchestration and management) could be merged or integrated into one entity without communicating through CFS portal.

CC SaaS (i.e. application) may communicate with the application instance running on the EC over the reference point Ma2 depending on the implementation of application.

CC data plane (DP) and EC data plane (DP) are connected through the reference point Mc4 over the underlying bearer networks.

A user device (UE) can attach to an AP of underlying bearer networks connecting to an Edge Computing host on which application instances are running to offer the Internet services. The application client software running on UE can communicate with the application instance of the EC to receive Internet service. For example, the application client may start a service request, like browsing a web page. The service request may be routed to the cloud and then redirected by the cloud to an Edge Computing host which is close to the UE, or directly routed to an EC host by DHCP of underlying bearer networks. As result the service request from UE is routed to an EC host. If no application instance is running for the service requested by the UE on the EC host, the EC Orchestrator may request the EC platform manager to instantiate an application on the EC host to produce the service to the UE. Therefore, the UE can consume the service provided by the application instance running on the EC host with lower latency and better QoS than the same service provided by the cloud.

In wireless communication network, a UE (101) consuming a service produced from an application instance (107) on an EC host (106) can move from one location to another, like from attaching to AP1 to attaching to AP2 in FIG. 1A. If an EC host is associated to an AP, such UE's movement could cause the traffic path change, and may trigger application relocation to another EC host so that UE can continue receiving the best service from a nearby EC host.

For example, a topology of UE in the edge computing environment can consists of a number of EC hosts in a coverage area, which are inter-connected by the underlying bearer network, and managed by the EC orchestrator and platform manager. Each EC host covers a particular serving area mapped to the underlying network coverage, and multiple EC hosts establish a large serving area for UEs. When a UE moves, it could result in the UE attachment change from one EC host serving area to another EC host serving area, which may trigger the application mobility for relocating the application instance from the current serving EC host to another EC host to continue providing the best service to the UE.

The service continuity depends on not only the support of Edge Computing system, but also the support of application itself and underlying networks.

This patent document discloses an innovated mechanism to support the application mobility within an EC system or between two EC systems, or between an EC and CC.

An application mobility may involve transferring the application context including user context and application status information and/or relocate an application instance to another EC host without loss of service continuity to the UE. The relocating of application instance to another EC host means to instantiate the same application if the same application is not available or not have enough bandwidth to support a new UE client.

In order to support the service continuity to UE, a mechanism of application mobility is disclosed for establishing a peer or multiple peers of active-standby applications to serve to a UE so as to reduce the transaction gap time during relocation of the application.

Figure 4:
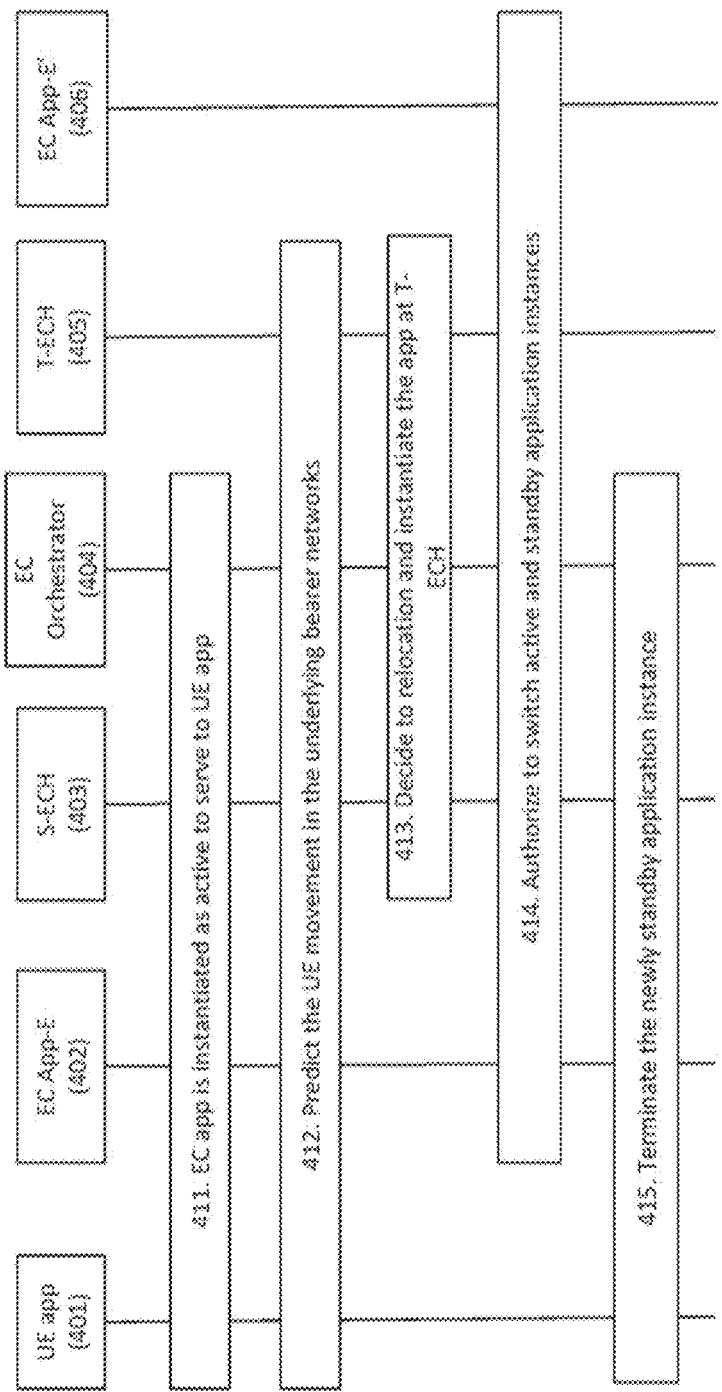
FIG. 4 shows an example of active-standby application instantiation procedure.

FIG. 4 illustrates an example of active-standby application instantiation flows.

411) EC system notifies the available services offered by EC hosts. Before or during the EC application initiation, the UE can subscribe the application mobility service. Therefore, when the UE moves in the underlying network, the EC system can provide the application mobility service to the subscribed UE for optimizing the services.

When EC Orchestrator (404) receives a request redirected from the Cloud or from the UE application client directly, the EC orchestrator instantiates an application (App-E 402) at a source EC host (S-ECH) (403) to serve an app client on UE (UE app) (401). The application instance (App-E) (402) is operated as an active one to serve to the UE app (401), which processes the UL traffic sent from the UE client (401) and transmits DL service data traffic to the UE client (401).

412) The EC application mobility service working with other services like RNIS or location service offered by EC platform predicts the potential EC host(s) that the UE would move to when the UE moves in the underlying bearer networks. The prediction about UE movement of application mobility service may be implemented based on the report of the underlying bearer networks, and/or through the detection service(s) offered by the serving EC host (403) or surrounding target EC hosts (405), or the UE client software itself (401). In addition, the EC application mobility service may receive the application relocation instruction from the EC orchestrator to start application re-location for balancing the traffic load, or improving the users QoE.

413) Based on the prediction information about UE movement reported from the application mobility management, the EC Orchestrator (404) decides the relocation of application instance and instantiates the same application (App-E') (406) on one or more target EC host(s) (405) with the same application context as that in the active App-E (402) being served to the UE client (401). Those application instances (App-E') (406) on target EC hosts (405) are operated in the standby application mode to serve to the UE client (401). The standby application instance (App-E') (406) may receive the UL traffic to keep the application and UE context synchronized with the active application instance, but may not transmit DL service data to the UE client through either controlled at L2 or TCP/UPD/IP layer or the application itself.

414) When certain criteria are met, the EC orchestrator (404) will authorize the operation mode switching between the active application App-E (402) and one of standby application(s) App-E' (406), i.e. let one standby application instance App-E' (406) to take over the active role to serve the UE client (401), and deactivate the existing active application instance App-E (402).

415) If the UE further moves out the serving area of the source EC host (S-ECH) (403), or under other condition like reduce the consumption of computing resources, the EC orchestrator (404) may initiate the procedure of terminating the newly standby application instance (App-E) (402) at the source EC host (S-ECH) (403) if it does not serve to other UE clients. If the UE will move back to the serving area of EC host (403), the EC orchestrator may instantiate the same App-E instance on EC host (403), and put it in the standby mode for synchronizing with the current active App-E'. EC orchestrator can initiate the active and standby mode switching when the switching criteria is met.

Figure 5:
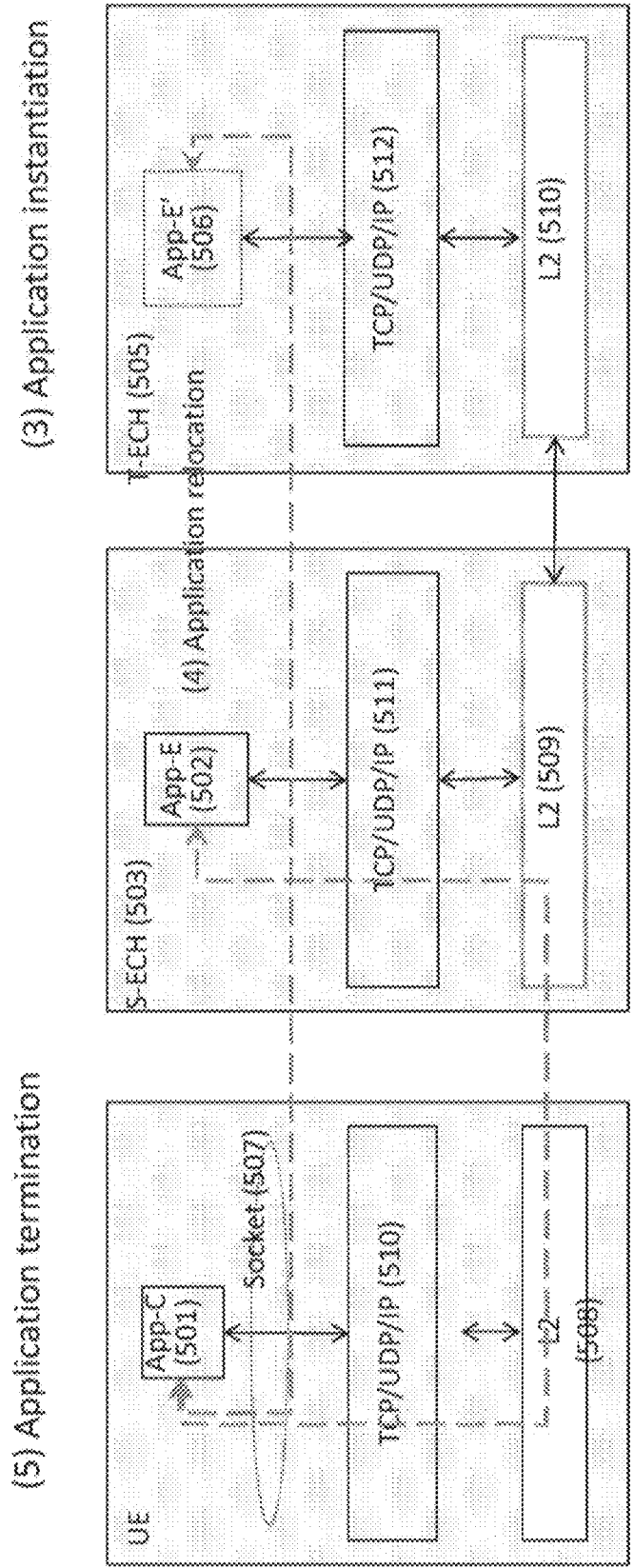
FIG. 5 shows an example of active-standby application instance switching over L2 network.

FIG. 5 shows an example of implementing application mobility mechanism with the layer 2 network support.

The UE application client (501) is communicating the EC application App-E (502) through the socket (507) of TCP/IP protocol stack via L2 (508) switching networks. The data packet will be delivered to App-E (502) over L2 (509) network using TCP/IP protocol stack.

The information flow of application mobility over the L2 network may be as follows:

511) an application client software (App-C) (501) is running on UE and establishes a communication with the application instance (App-E) (502) running on a source EC host (S-ECH) (503). The communications between App-C (501) and App-E (502) is over the socket (507) of TCP/UDP/IP and Layer 2 networks (L2) (508) and (509).

2) When the UE moves to the serving area of target EC host (T-ECH) (505), the EC system is triggered to instantiate the same application (App-E') (506) as the App-E (502) on the T-ECH (505). The App-E' (506) shares the same IP address with App-E (502) (i.e. floating IP address during the application life cycle), but may have different L2 (509) and (510) MAC address associated with different EC hosts (503) and (505). The App-E' (506) is in the standby mode.

3) The L2 (509) of S-ECH (503) and L2 (510) of T-ECH (505) are inter-networked.

4) When the UE's movement triggers the switching criteria of application mobility, the EC orchestrator will authorize the App-E (502) and App-E' (506) to switch their operation mode and switch the mode in L2 network (509 and 510). Therefore the App-E' (506) will continue to serve the UE client (501) after switching. As the App-E (502) and associated TCP/UDP/IP stack (511) are the same as the App-E' (506) and associated TCP/UDP/IP stack (512), the active and standby mode switch on the L2 network (509 and 510) are completely transparently to the UE client (501), and there is no necessity to re-bind (or switch) the IP address (511) and (512) comparing to L3 based application mobility.

The L2 based active-standby application mobility could be implemented via a switched Ethernet. As the switched Ethernet is of very high throughput and less low latency like GE or Multi-gigabit Ethernet, and support of direct P2P connection, and multi-cast, it can efficiently distribute the traffic to multiple application instances on different EC hosts.

Figure 6:
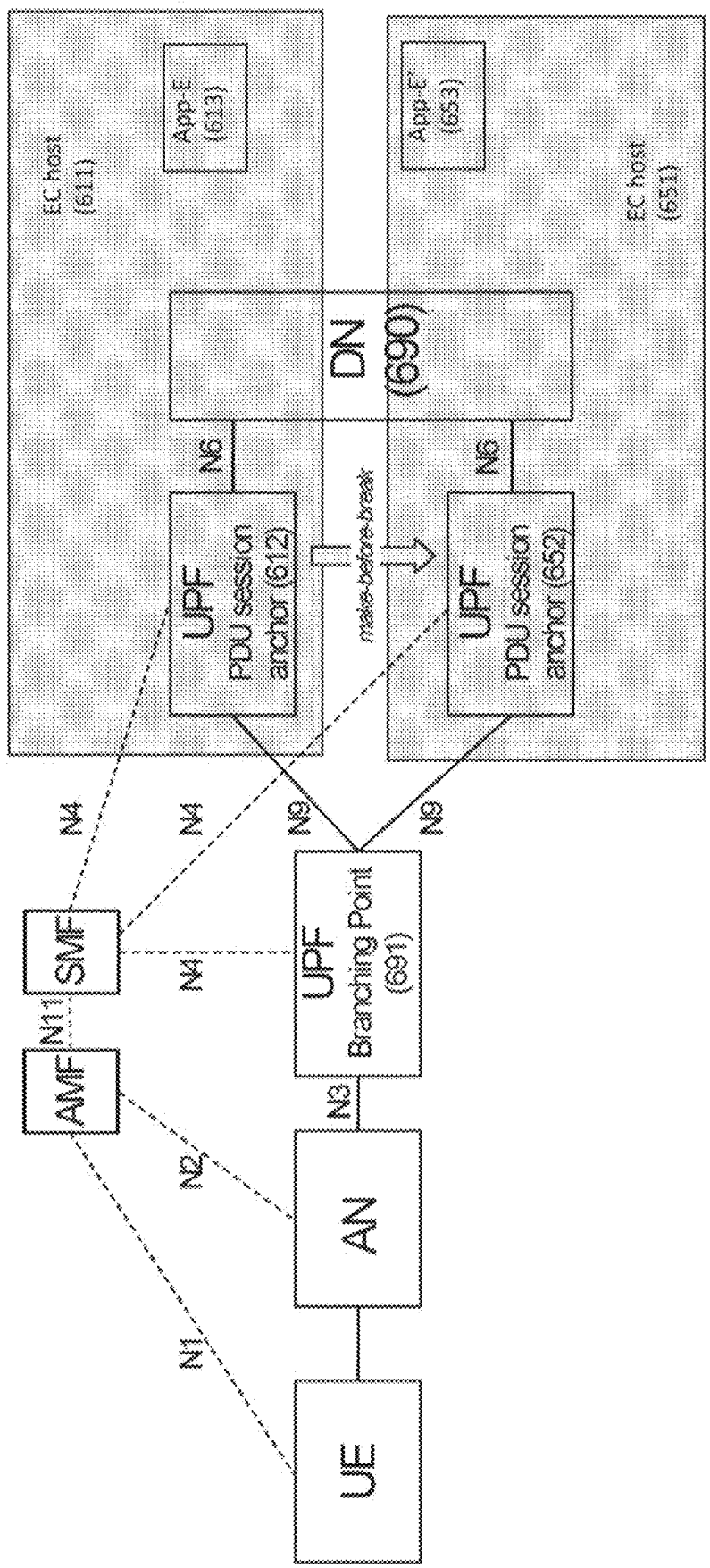
FIG. 6 shows an example of edge computing host being deployed in 5G network.

FIG. 6 illustrates an example of implementing application mobility of edge computing in 5G networks. The 5G network consists of User Plane (UP) and Control Plane (CP). The UP contains functional entities such as Access Network (AN), User Plane Function (UPF) and Data Network (DN). In the CP, it contains Access and Mobility Management Function (AMF), Session Management Function (SMF).

The UPF is responsible for the user traffic forwarding or steering. It can be implemented in different ways control the traffic routing, forwarding and steering. In this example, the UPF (691) attached to the AN is implemented as a branching point to split the UL traffic into two paths to another two UPFs: PDU session anchor (612) and (652). Therefore the traffic over UPF (612) and UPF (652) may be implemented to support the active and standby mode respectively via controlling the L2 switching of UPF branching point (691). When the UE attaches to the underlying network associated to EC host (611), the UPF branching point (691) will forward the UL user traffic to the App-E (613) over UPF PDF session anchor (612), and make App-E (613) and UPF (612) in the active. When the UE moves to the underlying network entity associated to EC host (651), the UPF branching point (691) will forward the UL user traffic to the App-E' (653) over UPF PDF session anchor (652) and make App-E' (653) and UPF PDU session anchor (652) in active and may deactivate App-E (613) and UPF PDU session anchor (612). During the application mobility handover period, the UL traffic may be delivered to both UPF PDU session anchors (612) and (652). The EC hosts (611) and (651) then control the delivery of UL traffic according to the active and standby application instances running on the EC hosts respectively.

Figure 7:
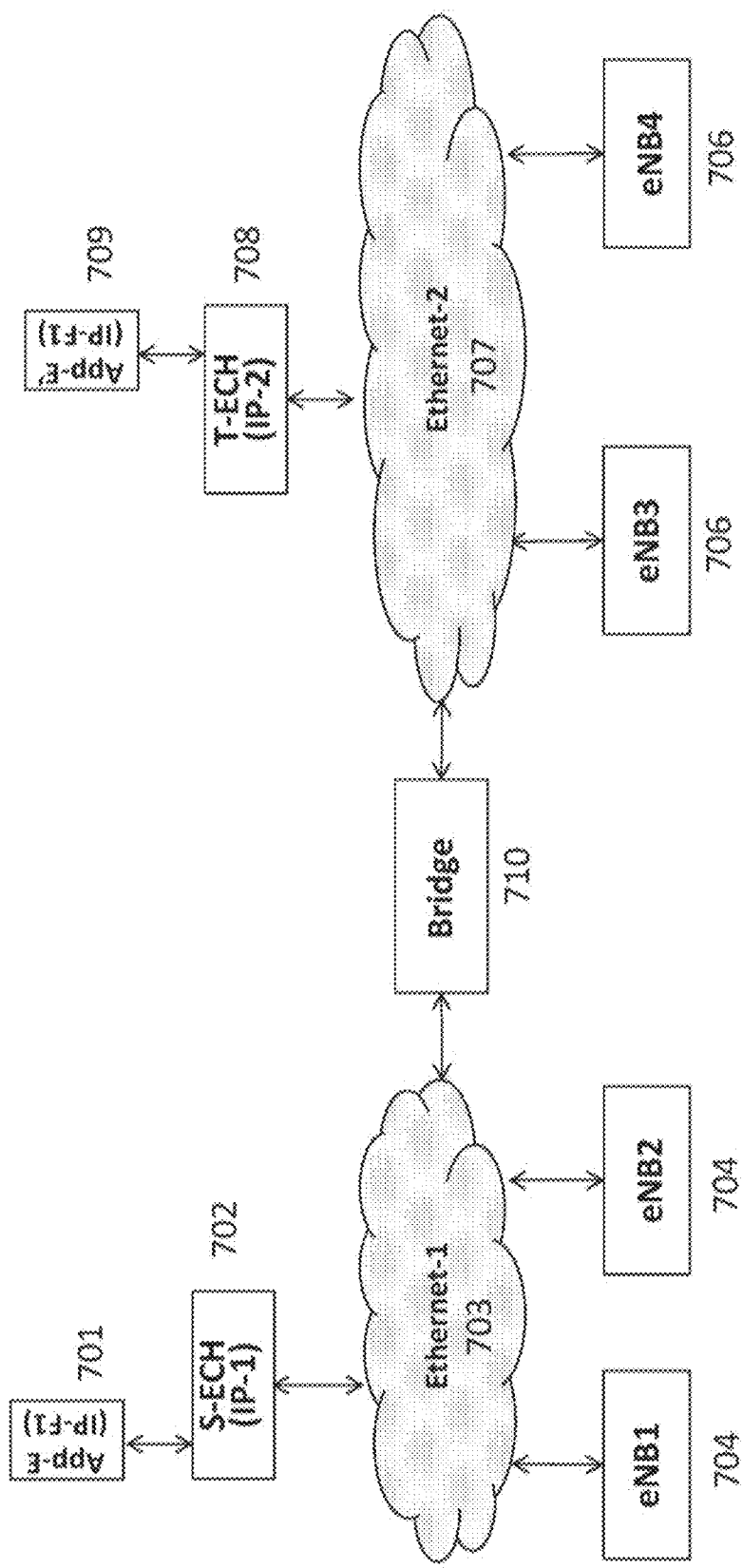
FIG. 7 shows an example of active and standby application instance switching over L2 bridged networks.

FIG. 7 illustrates an example of implementation for application mobility over bridged Ethernet.

1) App-E (701) is running on an EC host (S-ECH) (702) to serve to a UE client (not shown in the figure). It is assigned a floating IP address (IP-F1). The S-ECH (702) is attached to Ethernet-1 (703) which connects eNB1 (704) and eNB2 (704). The S-ECH (702) has the IP address of IP-1.

2) App-E' (709) is running on an EC host (T-ECH) (708) and in the standby mode after the UE is detected to move to eNB3 (706) and the same application is instantiated at EC host (T-ECH) (708). The T-ECH (708) has the IP address of IP-2. The App-E' is assigned to the same floating IP address (IP-F1) as App-E. The T-ECH (708) is attached to Ethernet-2 (707) which connects to eNB3 (706) and eNB4 (706). The S-ECH (702) and T-ECH (708) are inter-connected over a bridge (710).

3) An Ethernet switches (703 and 707) could be implemented to include a UPF to steer the UL traffic to the application (701) or (709) and forwarding DL application traffic to the UE client over an eNB. When the UE attaches to eNB1 (704), the application instance App-E (701) serves the UE over the Ethernet-1 (703) connecting to the eNB1 (704). When the UE moves the serving area of T-ECH (708) over the eNB3 or eNB4 (706), the UE may continue receiving the service from App-E (701) over the bridge (706), i.e. the UL traffic steering and DL traffic forwarding could be across two Ethernets (703 and 707) over a bridge (710) to support the UE moving between subnets.

4) When the UE continues moving, the EC system may authorize the application service to switch active application instance to App-E' (709) to serve the UE client for optimizing the service performance, and set App-E (701) in the standby-mode for synchronizing the context of application and user with App-E' (709). Therefore, the application mobility interrupt time can be minimized and service continuity can remain when UE moves in the underlying bearer networks.

Figure 8:
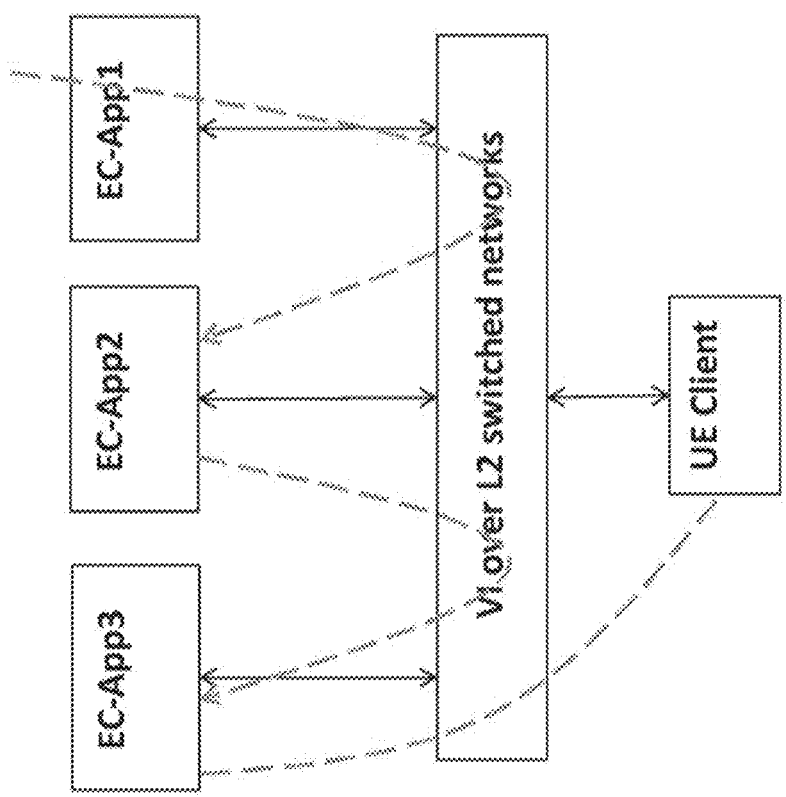
FIG. 8 shows an example of service chaining through application mobility via L2 switched networks.

FIG. 8 shows an example of service chaining over L2 switched networks. L2 switching is more efficient in support of service chaining as it can provide fast forwarding of the data packets comparing to the L3 routing. In the service chaining, multiple different application instances (or micro services) running on different EC hosts can be chained together to deliver the service to the end consumer via configuring the MAC address of ingress and egress ports. The L2 switched network connects the multiple application instances running on different EC hosts as they are running on the same EC host.

In addition to the service chaining, the L2 switched networks can be easier to enable service capability expansion via allocating a group of instances of the same application to form a service pool to serve multiple UE clients at the same time. The size of service pool may depend on the number of consumers requesting the same service. The EC manager may need to maintain a list of MAC address of instances with the same application running on different EC hosts and distributes the traffic among multiple application instances running on different EC hosts. When the EC orchestrator receives a request for a new service on the application, the EC orchestrator may check of load information on each EC host. EC orchestrator may maintain a record of load information of application on each EC host so that it can get such load information of application immediately. If the EC orchestrator finds the existing application running on EC host is overloaded and not be able to serve the new request, it may instantiate a new application on the EC host with less loading and redirect the service request to the new instantiated application. As the new instantiated application is connected over high bandwidth L2 switched network, the UE client may not be able to notice which EC host is hosting the application instance serving to the UE. In this way, EC orchestrator can balance the EC host loading easily and make it completely transparent to UE.

Figure 9:
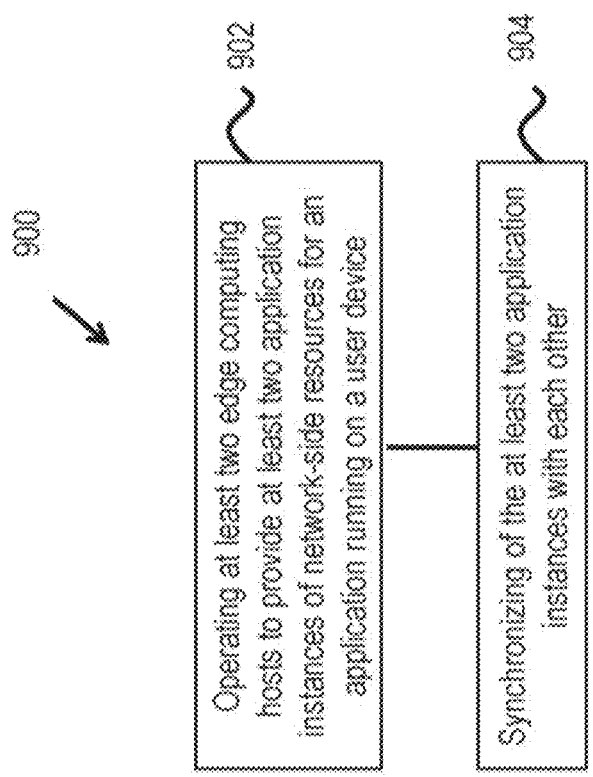
FIG. 9 is a flowchart for an example method of wireless communication.

FIG. 9 is a flowchart for an example method 900 of wireless communication. The method 900 may be implemented on the network-side in a wireless communication network. The method 900 includes operating (902) at least two edge computing hosts to provide at least two application instances of network-side resources for an application running on the user device; and synchronizing (904) of the at least two application instances with each other. As further described with respect to FIGS. 1A to 7, in some embodiments, the synchronization may be performed by mirroring the two or more (or at least two) application instances. In some cases, the application instances may be operated in one of two modes: an active mode and a standby mode, wherein, in the active mode, the application instances are configured to receive data from the user device and transmit data to the user device, and in the standby mode, the application instances are configured to receive data from the user device or another application instance in the active mode, and refrain from transmitting data to the user device.

In some embodiments, e.g., as described with respect to FIG. 5 and FIG. 8, the method 900 may further include operating a layer 2 (L2) mechanism for routing data packets between the user device and the at least two application instances. In some implementations, the L2 mechanism is operated such that packets from the at least two edge computing devices to the application running on the user device have a same sender address at a layer above L2. Internet Protocol based addressing may be used at the layer above L2. As further described with respect to FIGS. 1A and 1B, the method 900 may further include interfacing the at least two edge computing hosts with a service gateway and a packet data gateway for a wireless cellular network in which the user device operates, and/or interfacing the at least two edge computing hosts with a user plane function for a 5G network in which the user device operates.

Figure 10:
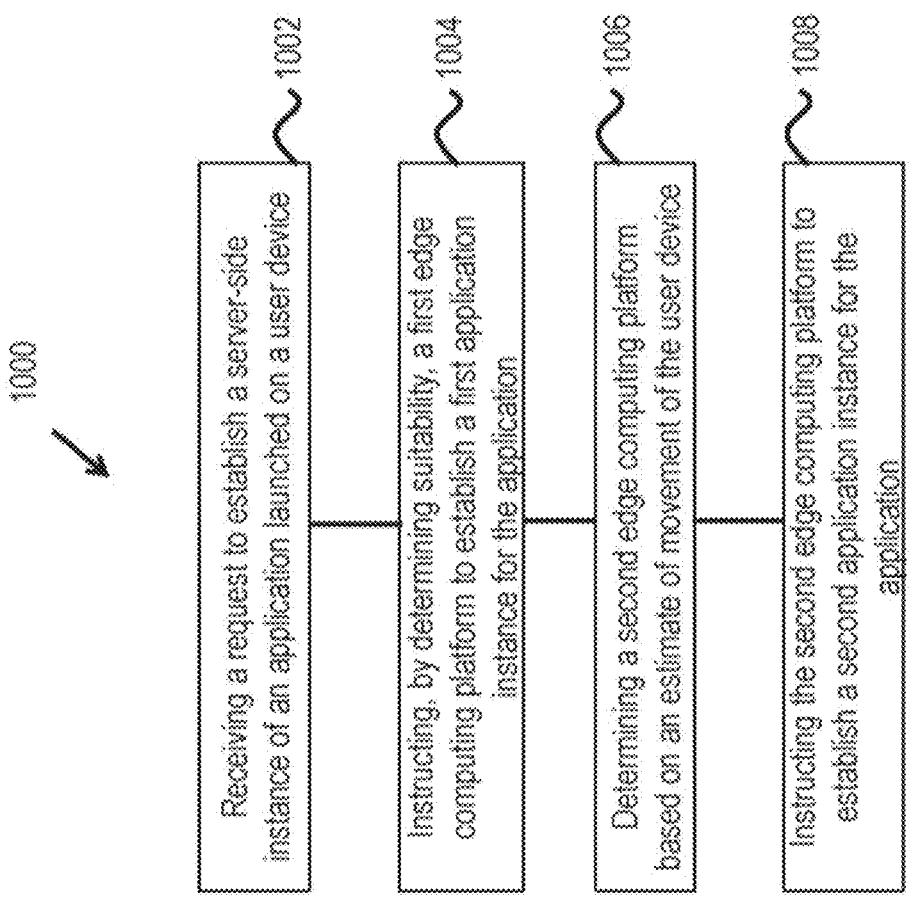
FIG. 10 is a flowchart for an example method of wireless communication.

FIG. 10 is a flowchart for an example method 1000 of wireless communication. The method 1000 includes receiving (1002) a request to establish a server-side instance of an application launched on the user device, instructing (1004), by determining suitability, a first edge computing platform to establish a first application instance for the application, determining (1006) a second edge computing platform based on an estimate of movement of the user device; and instructing (1008) the second edge computing platform to establish a second application instance for the application. In some embodiments, for example as described with reference to FIG. 1A to FIG. 8, the method 1000 may further include controlling, based on a current location of the user device, the first application instance and the second application instance such that one of the first and second application instances is in a data transmission/reception mode and the other of the first and second application instances or a corresponding layer 2 network mechanism is in a data receive-only mode. In various embodiments, the request may be received from the user device and/or the cloud computing resources. In some embodiments, the estimate of the movement is performed using information from the bearer network in which the user device is operating.

Figure 11:
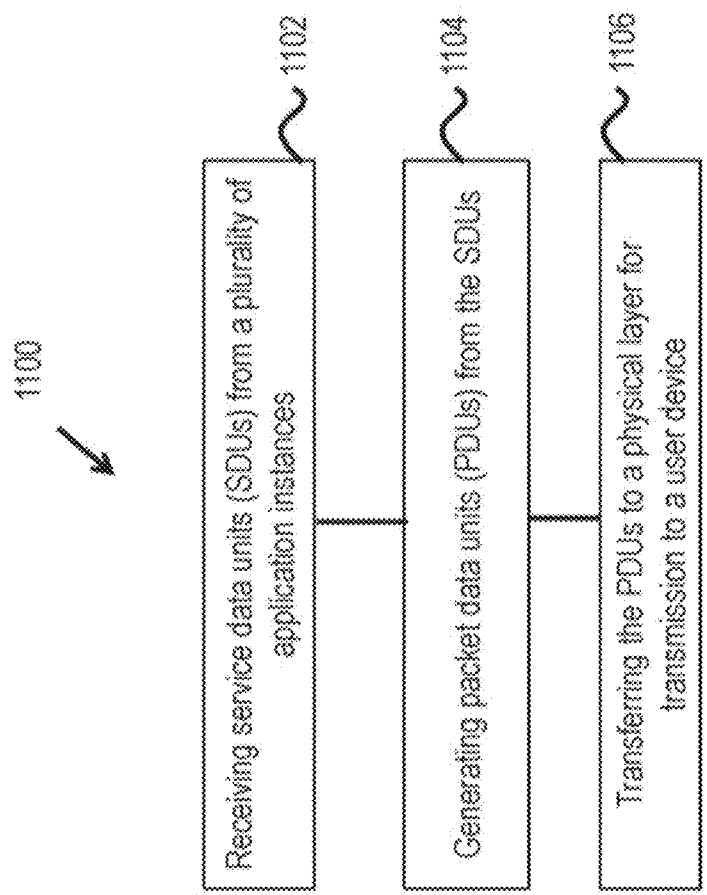
FIG. 11 is a flowchart for an example method of wireless communication.

FIG. 11 is a flowchart for an example method 1100 of wireless communication. The method 1100 includes receiving (1102) service data units (SDUs) from a plurality of application instances, generating (1104) packet data units (PDUs) from the SDUs; and transferring (1106) the PDUs to a physical layer for transmission to a user device. The PDUs are generated to provide an appearance to the user device that the PDUs have originated from a single application instance.

In some embodiments, the method 1100 including forming SDUs to have a same IP address in the source field when they get converted into corresponding PDUs for transfer over the lower layer protocol stack such as the physical layer. In other words, at the layers above the L2, the SDUs may be distinguishable based on different addresses in headers corresponding to the different edge computing hosts. However, an L2 mechanism may convert them into IP PDUs for which, from a user device's perspective, the PDUs originated from a single edge computing host. Furthermore, as described with respect to FIGS. 5 and 8. The L2 mechanism may also perform load balancing among the edge computing host resources. The L2 switched network may use an EC resource that is most suitable and drop using another EC resource that may be getting bottlenecked, all without the user device and application running on the user device noticing any switching artifacts when switching EC resources. Suitability may be decided based on amount of computing resources, type of computing resources (operating system, supported media formats, etc.).

In some embodiments, a method of wireless communication includes operating an edge computing host on a network-side, the edge computing host provide application layer resources for execution of applications on user devices, wherein the edge computing host is configured to simultaneously implement an active session for a first application running on a first user device and a standby session for a second application running on a second user device. In some embodiments, one user device can have two or more different applications (i.e. clients) connecting to different EC applications on different EC hosts. Even more, some user device app clients can communicate with EC app, while other UE apps may communicate with the applications running on the cloud. All of the network-side resources may be load-balanced and seamlessly selected by the L2 mechanism as described herein.

Figure 12:
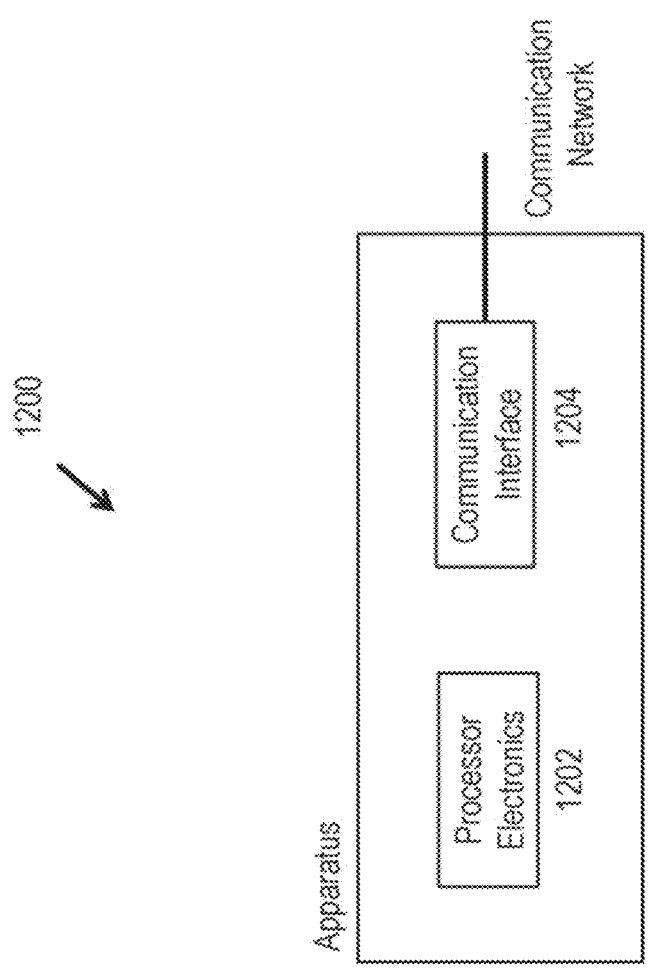
FIG. 12 is a block diagram showing a portion of an example communication apparatus.

FIG. 12 is a block diagram showing a portion of an example apparatus 1200. The apparatus 1200 may be used to implement one or more of the various methods and functions (e.g., edge computing host, orchestrator, etc.) described in the present document. The apparatus 1200 includes processor electronics 1202. The processor electronics 1202 may be programmed to implement the methods described herein. For example, the processor electronics 1202 may read code stored in a memory (not shown in FIG. 12) and execute the code to implement the methods. The apparatus 1200 includes a communication interface 1204 that is communicatively coupled with the processor electronics 1202 and with a communication network. For example, the communication interface 1204 may be a wired interface such as Ethernet, GigE, optical fiber, and so on. In some embodiments, the communication interface 1204 may be a wireless interface such as a 3G/4G/5G wireless interface, and so on.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more non-transitory computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method for facilitating wireless communication, comprising:
   operating at least two edge computing hosts to provide at least two application instances of network-side resources for an application running on a user device, wherein each of the application instances is operated in one of an active mode or a standby mode; and
   synchronizing the at least two application instances with each other before an operation mode switching between the at least two application instances.

2. The method of claim 1, wherein the synchronizing includes mirroring the at least two application instances.

3. The method of claim 1, wherein, in the active mode, the application instances are configured to receive data from the user device and transmit data to the user device, and in the standby mode, the application instances are configured to receive data from the user device or another application instance in the active mode, and refrain from transmitting data to the user device.

4. The method of claim 3, further comprising:
   operating a layer 2 (L2) mechanism for routing data packets between the user device and the at least two application instances.

5. The method of claim 4, wherein the operating the L2 mechanism includes operating the L2 mechanism such that packets from the at least two edge computing devices to the application running on the user device have a same sender address at a layer above L2.

6. The method of claim 5, wherein the same sender address is an Internet Protocol (IP) address.

7. The method of claim 1, wherein the operating the at least two edge computing hosts includes interfacing the at least two edge computing hosts with a service gateway and a packet data gateway for a wireless cellular network in which the user device operates.

8. The method of claim 1, wherein the operating the at least two edge computing hosts includes interfacing the at least two edge computing hosts with a user plane function for a 5G network in which the user device operates.

9. A method of wireless communication comprising:
   receiving, by a network entity configured to manage other network entities and orchestrate the operation of applications, a request to establish a server-side instance of an application launched on a user device;
   instructing, by the network entity, by, a first edge computing platform to establish a first application instance for the application;
   determining by the network entity, a second edge computing platform based on an estimate of movement of the user device; and
   instructing by the network entity, the second edge computing platform to establish a second application instance for the application.

10. The method of claim 9, further including:
    controlling, based on a current location of the user device, the first application instance and the second application such that one of the first and second application instances is in a data transmission/reception mode and the other of the first and second application instances or a corresponding layer 2 network mechanism is in a data receive-only mode.

11. The method of claim 9, wherein the request is received from the user device.

12. The method of claim 9, wherein the request is received from a cloud computing resource.

13. The method of claim 9, wherein the estimate of movement of the user device is determined based on information obtained from the user device.

14. The method of claim 9, wherein the estimate of movement of the user device is determined based on information obtained from an underlying bearer network in which the user device is operating.

15. A method of operating a layer two switching mechanism in a digital packet communication network, comprising:
    allocating, by a network entity configured to coordinate host devices in the digital packet communication network, a plurality of application instances to form a service pool for a service, wherein the instances of the application are hosted on different host devices;
    receiving service data units (SDUs) from the plurality of application instances, wherein the SDUs include different addresses to distinguish the different host devices; and
    transmitting packet data units (PDUs) generated from the SDUs to a user device,
    wherein the PDUs include a same source address such that the PDUs appear to have originated from a single application instance to the user device.

16. The method of claim 15, including load balancing application layer load among application instances in the plurality of application instances.

17. The method of claim 15, further comprising:
    maintaining a list of MAC addresses of instances of a same application running on different hosts; and
    distributing traffic of the same application among the instances.

18. The method of claim 15, further comprising: maintaining a load information on each of the hosts, and checking the load information, after receiving a request from a service.

19. The method of claim 15, further comprising:
    instantiating, upon determining an existing application instance on a first host device is overloaded, a new application instance on a second host device; and
    switching from the first host device to the second host device for providing the service to the user device with the user device being agnostic about the switching.

* * * * *